United States Patent Office 3,022,173
Patented Feb. 20, 1962

3,022,173
MAKING COFFEE AND TEA BREWS AND THE RESULTING PRODUCT
Herman Tiedemann, Scotch Plains, N.J., assignor to General Aniline & Film Corporation, New York, N.Y., a corporation of Delaware
No Drawing. Filed May 7, 1956, Ser. No. 582,921
2 Claims. (Cl. 99—28)

The invention here presented is a new and useful composition of matter in the form primarily of a combination of soluble tea and coffee extract with polyvinylpyrrolidone.

Our forefathers bought coffee, ground or unground, but usually roasted, and brewed the coffee themselves by treatment with boiling water in many ways, some in the simple coffee pot; others in various types of percolators and the like, but all of these procedures were time-consuming and definitely an annoyance before breakfast. These annoyances being realized, various workers in the field brewed coffee, and tea, in large quantities under ideal conditions to yield the best possible coffee, and then evaporated the resulting coffee by a wide variety of procedures, some using a spray drier in which the hot coffee was sprayed under pressure, or by the aid of air, into a current of heated air, whereby the necessary amount of heat energy was provided to evaporate the water in which the coffee was brewed. The water vapor was then carried off by the current of heated air and the dry coffee extract was collected as a fine powder in a receptacle placed below the current of heated air. Other coffee brewers flowed the brewed coffee on to a steam heated drum, upon which the carrying water was evaporated, and the coffee solids then scraped off the drum by a "doctor knife." Many other procedures were tried but these two proved to be most successful. However all of these procedures suffer from the serious fault, that a substantial and significant part of the essential oils, which give any cup of coffee its flavor, were lost in the drying air and to the present no satisfactory procedure has been found for recovering these volatile oils. Likewise dried coffee extract, by whatever process made, is slow to dissolve, and is of such low solubility that it dissolves with reasonable speed only in scalding hot water which is poured into the cup under conditions of vigorous ebullition, necessitating a quick trip between the stove and the kitchen table.

According to the present invention it is now found that the addition of small amounts of polyvinylpyrrolidone very greatly improves the process of concentrating coffee, and yields a superior coffee extract, as far as flavor and aroma is concerned, and simultaneously one which is outstandingly superior in its solubility such that a clear, satisfactory solution of maximum flavor, taste and aroma is easily secured without the requirement for vigorous ebullition on the part of the dissolving water.

Thus the present invention provides a new and useful coffee extract which takes the form of a new composition of matter having superior properties of many kinds. Other objects and details of the invention will be apparent from the following description.

The primary raw material for the composition of the present invention is the coffee bean; grown in tropical and sub tropical climates, collected by native labor, packed and shipped to the point of consumption. There the coffee is roasted to bring out an optimum amount of flavor and aroma, and for the purposes of this invention, the coffee is then treated with boiling water to "brew" the desired coffee; the water used being preferably as hot as possible, even under pressure if desired although such is rarely used at the present time. The resulting brew preferably is given the utmost care, to yield as flavorful and tasty a brew as possible.

It will be observed that coffee as so brewed is a dilute water solution containing substantial quantities of tannic acid, substantial quantities of caffein, small quantities of the natural sugars inherent in the bean, and very small, but significant amounts of essential oils, the compositions of which are to the present entirely unknown but appear to be in large part higher alcohols and higher aldehydes, ketones and the like, with, perhaps, traces of the higher organic acids in addition to the tannic acid. It is found however, that in spite of the utmost efforts, an undesirably large amount of the aroma of the coffee is lost in the brewing operation.

Accordingly it is found that the presence of small amounts of polyvinylpyrrolidone, amounts usually less than the total amount of solids in the coffee, if added to the brew, preferably in solution in the water in which the brew is prepared, will capture a significant amount of the aroma, holding it back in the water solution of polyvinylpyrrolidone, thereby resulting in a much more aromatic flavorful, tasty brew.

It will be noted that polyvinylpyrrolidone is a tasteless, odorless, water soluble, relatively high molecular weight polymer which is completely free of any ill effect upon the human system (to the point that it is habitually used as a plasma substitute in giving blood transfusions!).

The amount of polyvinylpyrrolidone is quite variable according to the ideas of the brew master, and may range from an amount as small as 10 percent or 5 percent or even as little as 1 percent of the total amount of solids in the coffee brew to as much as double the amount of solids in the coffee brew. The latter amount however is usually undesirable because of the change in texture of the coffee concentrate obtained thereby.

If the coffee has been brewed without the presence of the polyvinylpyrrolidone, it may be added to the brew at the conclusion of the brewing operation; the only requirement being that it then be in complete solution in the brew.

The coffee brew, with its contained polyvinylpyrrolidone, is then ready for the concentrating operation. The same apparatus may be used as has been used in the past; as before, the preferred procedures being either spray drying or drum drying. In the case of spray drying, the presence of the polyvinylpyrrolidone offers a batch of material in which the essential oils are similarly soluble perhaps as a solid solution in the polyvinylpyrrolidone which separates out as the concentration operation proceeds. The resulting droplets of brew are substantially larger and heavier with less surface in proportion to their volumetric contents than is previously the case, thereby obtaining a much better retention of the essential oils from the brew, and resulting in addition in a much faster-settling coffee powder. As so prepared, the coffee powder shows a sharply reduced tendency to "cake" during storage, shows a much reduced loss of volatile oils during storage, even in the refrigerator; and in addition shows a much better solubility in the user's hands. It will be noted that the tannic acid which is the slow dissolving material in a coffee concentrate is interprecipitated during the concentration with the polyvinylpyrrolidone and the high solubility of the polyvinylpyrrolidone carries with it a powerful dissolving action upon the otherwise somewhat high insolubility of the tannic acid.

Alternatively if the concentration is effected by drum drying, the resulting material is much superior from the point of view of removal from the drum by the "doctor knife" since the texture, being very slightly rubbery, is better adapted to scraping off the drum and again, retention of the essential oils in the concentrating, is much better because of the solubility of the oils in the polyvinylpyrrolidone, and accordingly the drum dried concentrate likewise shows an excellent texture, being flaky, and a very ready solubility because of the presence of the polyvinylpyrrolidone; again yielding, in the hands of the user, a much more superior cup of coffee, without the necessity, in either form, of the use of scalding hot water in vigorous ebullition.

Concentrated tea is similarly prepared, the tea leaves being gathered from the plantation by native labor, dried in the usual fashion and shipped to the port of entry of the country in which it is to be consumed. The tea likewise is brewed in bulk, the polyvinylpyrrolidone being added to the brew water if desired, or added to the finished brew according to the brew-master's preference; in either event there being a significantly superior recovery of the valuable essential oils, aromatics, flavors and the like. The tea may then be sweetened slightly if desired or may be flavored slightly with lemon juice if desired, and then concentrated, as described above for the case of coffee, either by spray drying or drum drying as preferred, these being the dryers for both tea and coffee although other previously unsatisfactory dryers may on occasion be used, because of the much superior recovery of essential oils by the presence of the polyvinylpyrrolidone. In either event there is obtained a very excellent tea concentrate, in which the relatively slight amount of tannic acid exerts a much less powerful insolubilizing action, and accordingly the tea concentrate, and in some instances the coffee concentrate as well, can be satisfactorily dissolved in ice-water to make iced tea or iced coffee.

It may be noted that in the bulk brewing of coffee or tea, it is preferable that the brewing be done in closed containers to prevent the escape of the aromatic and flavoring components, especially if the polyvinylpyrrolidone is not added until after the brew has been completed.

By the process and composition of the invention there is thus obtained a new and valuable form of coffee and tea concentrates containing a much higher proportion of the original essential oils, and of much better solubility and form.

While there are above disclosed but a limited number of embodiments of the composition of matter it is possible to provide still other embodiments without departing from the inventive concept herein disclosed, and it is therefore desired that only such limitations be imposed upon the appended claims as are stated therein or required by the prior art.

The invention claimed is:
1. A composition of matter comprising a member of the class, consisting of coffee and tea, in the form of a concentrated brew, and polyvinylpyrrolidone, said polyvinylpyrrolidone being present in an amount of from 1 to 10% by weight of the solids present in said concentrated brew.
2. In the process for the preparation of a concentrated brew of a member of the class consisting of coffee and tea, which comprises the step of adding to the aqueous brew, prior to final concentration, polyvinylpyrrolidone, in an amount of from 1 to 10% by weight of the solids present in said brew.

References Cited in the file of this patent
UNITED STATES PATENTS

| | | |
|---|---|---|
| 1,367,715 | Pratt et al. | Feb. 8, 1921 |
| 1,866,415 | Lovand | July 5, 1932 |
| 2,393,562 | Perech | Jan. 22, 1946 |
| 2,454,510 | Heyman | Nov. 23, 1948 |
| 2,688,550 | McFarlane | Sept. 7, 1954 |

OTHER REFERENCES

"American Dyestuff Reporter," March 15, 1954, p. 67.
"Drug and Cosmetic Industry," July 1954, pp. 32–33, 126, 127, 129, 130.
"General Aniline and Film Corporation," New Product Bulletin No. P–100.